(12) United States Patent
Anderson et al.

(10) Patent No.: US 8,251,179 B2
(45) Date of Patent: Aug. 28, 2012

(54) PORTABLE SAFETY LADDER ASSEMBLY

(76) Inventors: James T. Anderson, Sierra Vista, AZ (US); J. Nigel Ellis, Wilmington, DE (US)

( * ) Notice: Subject to any disclaimer, the term of this patent is extended or adjusted under 35 U.S.C. 154(b) by 0 days.

(21) Appl. No.: 13/172,957

(22) Filed: Jun. 30, 2011

(65) Prior Publication Data

US 2011/0253478 A1    Oct. 20, 2011

Related U.S. Application Data

(63) Continuation of application No. 11/679,164, filed on Feb. 26, 2007, now Pat. No. 7,992,681.

(51) Int. Cl.
*E06C 1/00* (2006.01)
(52) U.S. Cl. ........................................................ 182/106
(58) Field of Classification Search .................. 182/194, 182/206, 106, 207; 280/163, 166; 114/362
See application file for complete search history.

(56) References Cited

U.S. PATENT DOCUMENTS

| | | | | |
|---|---|---|---|---|
| 1,926,696 A * | 9/1933 | Murphy | ......................... | 182/113 |
| 2,010,588 A * | 8/1935 | Gooden | ......................... | 182/106 |
| 2,467,800 A * | 4/1949 | Backlin et al. | ................ | 182/106 |
| 4,293,055 A * | 10/1981 | Hooser | ......................... | 182/106 |
| 4,418,792 A * | 12/1983 | Cerone | ........................... | 182/93 |
| 4,798,262 A * | 1/1989 | Margolies | ..................... | 182/106 |
| 5,033,582 A * | 7/1991 | Hoben | ............................ | 182/85 |
| 5,145,030 A * | 9/1992 | Pavlescak et al. | ............ | 182/113 |
| 6,003,633 A * | 12/1999 | Rolson | ........................... | 182/127 |
| 6,095,283 A * | 8/2000 | Ellis | .............................. | 182/82 |
| 6,386,318 B1 * | 5/2002 | Smith | ............................ | 182/97 |
| 6,578,666 B1 * | 6/2003 | Miller | ........................... | 182/127 |
| 6,769,513 B2 * | 8/2004 | Pettit | ............................ | 182/115 |

* cited by examiner

*Primary Examiner* — Alvin Chin Shue
*Assistant Examiner* — Daniel Cahn
(74) *Attorney, Agent, or Firm* — Sherr & Vaughn, PLLC

(57) ABSTRACT

A portable safety ladder assembly having safety extensions to permit safe and easy access to landing areas, working platforms, scaffolds, etc. The safety extension members have a plurality of horizontal handgrips ergonomically designed to prevent falls from the ladder assembly when a user is ascending upward or descending downward thereon.

19 Claims, 7 Drawing Sheets

PORTABLE SAFETY LADDER ASSEMBLY

CROSS REFERENCE TO PRIOR APPLICATIONS

The present application is a continuation of U.S. patent application Ser. No. 11/679,164 filed Feb. 26, 2007 (now U.S. Pat. No. 7,992,681), which is hereby incorporated by reference in its entirety.

BACKGROUND OF THE INVENTION

1. Field of the Invention

A portable safety ladder assembly having safety extensions members used in combination therewith to permit safe and easy access to a landing area, working platform or scaffold. Particularly, the portable safety ladder includes stowable safety extensions to thereby provide safe and convenient access to working platforms and includes a pair of safety extension members having horizontal handgrips or grab bars that enable a user to safely walk up or down the ladder.

2. Description of the Related Art

Occupational injuries resulting from ladder falls are a known hazard, especially for vehicles having flatbeds such as dock-height and drop-deck flatbed trailers and railcars, especially (but not limited to) those with head racks. Such falls result as the operator and/or driver is attempting to ascend or descend the flatbed, therein resulting in a disabling injury or even death. The Bureau of Labor Statistics (BLS) records for falls from non-moving vehicles show upwards of approximately 15,000 fall injuries per year. Moreover, access to the working surface of the flatbed poses significant risk of falling to the ground without a firmly installed flatbed ladder. Also, falls from ladders is one of the top three causes of occupational fatalities according to BLS statistics. Previously, access by ICC rail, a wheel rim or from cab to trailer transfer to access a flatbed having a height of approximately five feet or alternatively using a step ladder which can easily tip over and is unstable.

One prior art attempt for reducing ladder falls in a trucking application is providing a plurality of steps welded to the frame of a transport vehicle. This method, however, still places the driver and/or operator at risk when ascending up or descending down the ladder (again, especially when the trailer has a head rack that must be climbed around).

Furthermore, since tractors and trailers are sometimes interchangeable, operators will not always have the aforementioned steps available to them (even owner-operators who may be forced to use a rental tractor at times). Consequently, many drivers carry a portable step ladder strapped to the rear of the sleeper portion of the tractor. Often times, however, such portable step ladders are not utilized due to the inconvenience of deploying them when needed. Moreover, the base or feet of such prior art ladders are unstable, in particular, they are prone to inadvertent displacement or shifting from the support area on the ground surface when a user is ascending up or descending down the ladder. The base is also susceptible to slipping in hazardous surface conditions such as rain, snow, ice, etc., and thus, causes the ladder to move and/or topple over.

Another manner of ascending up or descending down the ladder to access a working platform of a flatbed trailer is by climbing up the rim and/or tire of the trailer (or the tractor, whose wheels are under the trailer). This manner, however, is extremely dangerous, especially when hazardous weather conditions such as rain, snow, ice, etc., are present.

Some prior art ladders include attachments permitting a user to access a landing area of a roof or other structure. Such attachments are secured at a distal end opposite the base of the ladder and include a pair of parallel vertical side rails or bars used as handrails for grasping by the user when access to the landing area is required.

The aforementioned design, however, has serious ergonomic drawbacks that lack adequate safety protocols to the user. For instance, such ladders lack any stability control that securely anchors the ladder against a vertically surface such as a wall to and prevent forward and/or lateral displacement of the ladder away from a support area on the ground.

Moreover, the use of vertical handgrips does not permit the user to adequately use a power gripping orientation of the hands required to maintain balance without slipping when falling backwards away from the front face of the ladder. Even still, if a power grip is used, it is nonetheless ineffective in the occurrence of a fall from the ladder since a slide of the user's hands will precede out of control, thus causing the user to fall to the ground as a result of the impact load from body's weight.

The configuration and size of the vertical grab bars also make it impossible for a user to encircle them by hand. As a result, the hand cannot form adequate gripping power necessary to withstand an impact load of the body if the user slips or loses balance. Accordingly, a "pinch grip" must be used which makes fall safety virtually impossible to achieve. Moreover, the spatial distance between the upper gripping area of the vertical handgrips and the walk through area is ergonomically problematic insofar as it requires the user to assume an unnatural, unsafe and uncomfortable bending position when ascending to the landing area from the ladder or transitioning from the landing area to the ladder. Such bending may actually result in the user falling from the ladder and/or the working platform.

Lastly, the prior art ladders lack the ability to have a user safely ascend/descend from the ladder using 3-point control, i.e., with two feet on the ladder or the ground and one hand one the ladder, or with two feet on the handgrips handles and one foot on the ladder. Any such attempt at three point control will result in the ladder tipping over and/or the user losing balance on the ladder and falling therefrom.

Accordingly, there is a very pressing need to mitigate or otherwise reduce the number of deaths and injuries resulting from falls from a ladder.

SUMMARY OF THE INVENTION

In view of the foregoing, it is an object of the present invention to provide a portable safety ladder assembly and a safety extension which permits a user to safely and quickly enter and leave a working platform/landing area of a structure or vehicle such as the flatbed of a transport vehicle or railcar.

It is another object of the invention to provide a portable safety ladder assembly ergonomically designed to mitigate or otherwise reduce various occupational injuries and/or deaths by acting as a fall arrest system capable of supporting an impact load from the body of the user in the occurrence of a user falling therefrom.

It is yet another object of the invention to provide a stowable portable safety ladder assembly sized for compact and convenient stowing.

It is a further object of the invention to provide a portable safety ladder assembly having removable safety extensions that are quickly and easily moveable between operative/inoperative positions on the side frames of the ladder and a storage position on the front and rear ends of the ladder.

It is still another object of the invention to provide a portable safety ladder assembly that may be securely anchored to a surface of a structure, vehicle and the like to prevent forward and/or lateral shifting or displacement (i.e., movement in directions parallel and/or perpendicular to the outer peripheral surface) of the ladder when placed in an operable position.

It is yet another object of the invention to provide a safety ladder extension having a plurality of horizontally oriented handgrips permitting a user to safely ascend/descend from a working platform or surface of a structure or vehicle, even under hazardous surface conditions such as rain, ice, snow, etc.

Another object of the invention is to provide a portable safety ladder assembly having safety extension members that are vertically and rotationally moveable relative to the ladder between operative and inoperative positions.

Still another object of the invention is to provide a portable safety ladder assembly having safety extension members that lie at the same angle and also in the same plane as the ladder when the assembly is leaned against an intended structure or vehicle.

Yet another object of the invention is to provide a safety ladder extension having horizontally extending handgrips and vertical poles forming a unique configurative array permitting a user to maintain a continuum of grips when ascending/descending from a ladder, even under hazardous surface conditions such as rain, ice, snow, etc.

Still an additional object of the invention is to provide a portable safety ladder assembly having safety extension members that when placed in an operative position is elevated above the working surface to a height permitting a user to stand at a substantially erect position (i.e., not a bending position) when transitioning from the ladder's walk-through section.

Yet and still another object of the invention is to provide a portable safety ladder assembly that permits three-point control by the user, i.e., the ability to safely ascend/descend from the ladder with two feet on the ladder/on the ground and one hand on the ladder, or two feet on the handles and one foot on the ladder.

Yet an additional object of the invention is to provide a safety extension a safety ladder extension having horizontally extending handgrips and vertical poles forming a unique configurative array permitting a user to use either a power- or hook-type handgrip that withstands impact loads from the user's body during the occurrence of a fall backwards by the user.

These, as well as other objects and characteristics of the present invention may be achieved in accordance with an aspect of the invention which includes a portable safety ladder assembly including a main ladder section or frame having a distal end including a walk-through area, a base end opposite the distal end which engages a base surface to provide an area of support for the assembly when the assembly is placed in an operable position against the outer peripheral frame, a pair of parallel side rails connected by a plurality of horizontal rungs, a front section from which a user engages the rungs when traversing up and down the assembly, and a rear section opposite the front section that is positioned proximate the outer peripheral frame, a first safety extension member provided on a respective one side rail and a second safety extension member provided on a respective other side rail, each of the safety extension members having first, second, third and fourth parallel horizontal handgrips, the handgrips being connected in an array such that the first and second horizontal handgrips are connected by a first outer vertical side pole, the second and third horizontal handgrips are connected by a second inner vertical side pole and the third and fourth horizontal handgrips are connected by a third outer vertical side pole, wherein the first horizontal handgrip is spaced above and proximate the walk-through section and the fourth horizontal handgrip is spaced above the walk-through a distance permitting the user to stand substantially erect when accessing the working platform.

Yet other objects and characteristics of the present invention may be achieved in accordance with another aspect of the invention which includes a portable safety ladder assembly having the main ladder section and safety extension set forth hereinabove, and also a stabilizing mechanism for securably anchoring the main ladder section to a surface and preventing at least one of forward and lateral displacement of the main ladder section away from a support area.

Still other objects and characteristics of the present invention may also be achieved in accordance with a further aspect of the invention which includes a portable safety ladder assembly having the main ladder section and safety extension set forth hereinabove, and also a coupling mechanism mounted on the side ends for removeably receiving a respective the leg portion in a manner such that the safety extension members and the main ladder lie in substantially the same plane when the assembly is placed in the operable position.

Yet and still other objects and characteristics of the present invention may also be achieved in accordance with an additional aspect of the invention which includes a portable safety ladder assembly having the main ladder section and safety extension set forth hereinabove and a storage mechanism mounted on the front and rear ends for removeably storing the safety extension members on the main ladder when the assembly is in an inoperable position.

Yet further objects and characteristics of the present invention may also be achieved in accordance with an aspect of the invention which includes a portable safety ladder assembly having the main ladder section, safety extension, stabilizing mechanism and coupling mechanism set forth hereinabove.

Still further objects and characteristics of the present invention may also be achieved in accordance with an aspect of the invention which includes a portable safety ladder assembly having the main ladder section, safety extension, coupling mechanism and storage mechanism set forth hereinabove.

Yet and still further objects and characteristics of the present invention may also be achieved in accordance with an aspect of the invention which includes a portable safety ladder assembly having the main ladder section, safety extension, coupling mechanism, storage mechanism and stabilizing mechanism set forth hereinabove.

Yet additional objects and characteristics of the present invention may be achieved in accordance with an additional aspect of the invention which includes a safety extension in combination with a ladder having a pair of side rails connected by a plurality of spaced rungs, the safety extension having a pair of safety extension members each provided on a respective side rail, each of the safety extension members having, a leg portion adapted for connection to a respective side rail in a manner such that the safety extension members and the ladder lie in substantially the same plane when the assembly is placed in a position accessible by a user, and first, second, third and fourth parallel horizontal handgrips, the handgrips being connected in an array such that the first and second horizontal handgrips are connected by a first outer vertical side pole, the second and third horizontal handgrips are connected by a second inner vertical side pole and the third and fourth horizontal handgrips are connected by a third outer vertical side pole, the first horizontal handgrip being spaced above and proximate the walk-through section while the fourth horizontal handgrip being spaced above the walk-through a distance permitting the user to stand substantially erect when traversing through the walk-through section.

Still additional objects and characteristics of the present invention may be achieved in accordance with an additional aspect of the invention which includes a method of accessing a landing area which includes the steps of providing a ladder having at a distal end thereof a walk-through area, providing a pair of safety extension members coupled to the ladder such that each safety extension member and the ladder lie in substantially the same plane, such safety extension members having a plurality of parallel horizontal handgrips connected by inner and outer vertical side poles, wherein the upper most horizontal handgrip is spaced above the walk-through section a distance permitting a user to stand substantially erect when accessing the landing area, positioning the ladder to an operable position against a surface area, traversing up the ladder and engaging the horizontal handgrips once the walk through area is reached to access the landing area.

Accordingly, the safety ladder assembly set forth herein extends numerous advantages in its portability and adaptability to facilitate quick and easy transfer of the user to a working surface (landing) while mitigating or otherwise greatly reducing the threat of occupational hazards that have heretofore have caused death or serious physical harm. Further advantages extending from practice of the invention may be achieved by a safety ladder that is easily stowable and quickly and efficiently assembled/disassembled on site. Also advantageous is a safety ladder extension having horizontally extending handgrips and vertical poles forming a unique configurative array permitting a user to maintain a continuum of grips when ascending up or descending down the ladder, even under hazardous surface conditions such as rain, ice, snow, etc. Such an array is also ergonomically efficient in permitting the user to employ either a power- or hook-type handgrip that withstands impact loads from the user's body during the occurrence of a fall backwards by the user. The array also permits the user to access the working platform from the walk-through area of the ladder in a natural exiting position, particularly, in a substantially erect position (i.e., not bend downwardly), when ascending/descending from the ladder.

Advantages of the invention may also be derived from a safety ladder assembly having a pair of safety extensions that are rotationally and releasably connectable to the main ladder section to provide ease in assembly, storage and transfer. Further advantageous of the invention may also be derived from a safety ladder assembly having a mechanism for securely stabilizing the assembly against the outer periphery of a surface, thereby preventing falls resulting from inadvertent forward and/or lateral shifting or displacement of the ladder from a support area. Such a stabilizing feature also maintains the assembly at the support area even in hazardous ground conditions such as rain, snow, ice and the like.

These and other objects, features and advantages of the invention will become more apparent from the following description when taken in conjunction with the detailed drawings that show, for purposes of illustration only, the preferred embodiments of the invention.

BRIEF DESCRIPTION OF THE DRAWINGS

The advantages of the invention will become more apparent to those skilled in the art in conjunction with the detailed description of the preferred embodiments, in which.

DESCRIPTION OF THE PREFERRED EMBODIMENTS

Figure 1:
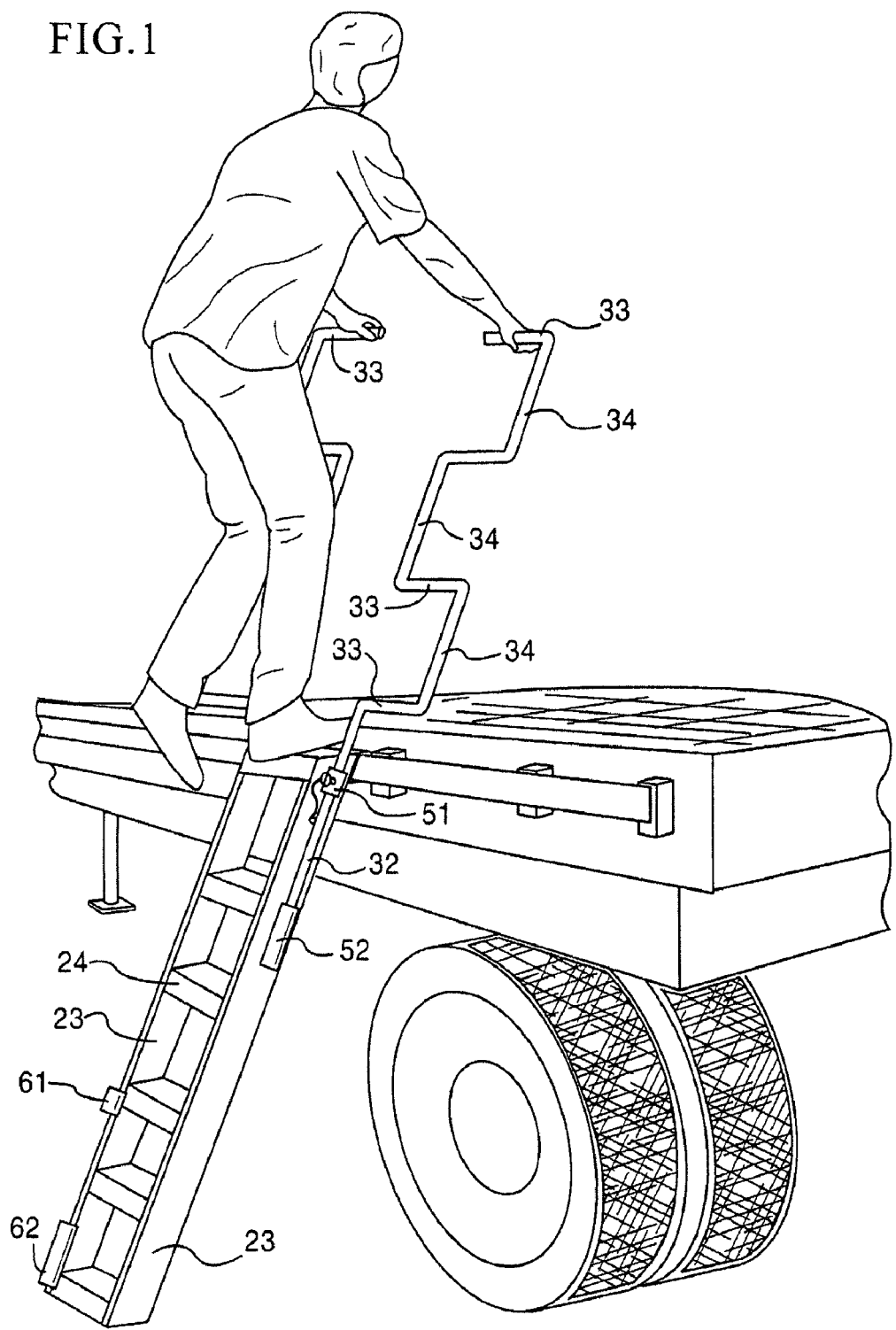
FIG. 1 is a perspective view of a user utilizing the portable safety ladder assembly towards the landing area of a flatbed trailer vehicle.

As illustrated in the drawing figures, provided herein is a portable safety ladder assembly 10 including a ladder 20 and a safety extension 30 for permitting a user to have safe access to a working platform of an intended structure such as a flatbed trailer, rail car and the like. The safety ladder assembly 10 or the safety extension 30 are not limited to use solely with flatbed trailers or railcars, and may be used for non-trailer purposes and various applications requiring access to any landing area, working platform, scaffold and the like.

As shown in FIG. 1, the ladder 20 includes a walk-through section 21 at a distal, uppermost end, a base end 22 which contacts and engages a base surface, e.g., the ground, to provide an area of support for the assembly 10 when placed in an operable position. The ladder 20 also includes a pair of parallel side rails 23 connected by a plurality, i.e., more than two, of horizontal rungs 24, a front section 25 directly facing wherein which a user may access and engage the rungs 24, and a rear section 26 lying proximate the outermost peripheral surface of the frame of the intended structure or vehicle when the assembly 10 is placed in a user ready position. Preferably, the width of each rung 24 is about sixteen inches, the space between each rung 24 is preferably about twelve inches and the width of the walk-through section 21 is preferably about eighteen inches. The width of each rung and the spacing between rungs, however, is not limited to any particular size and thus, may be of any size or range of sizes permitting access to a working platform or landing area.

Figure 2:
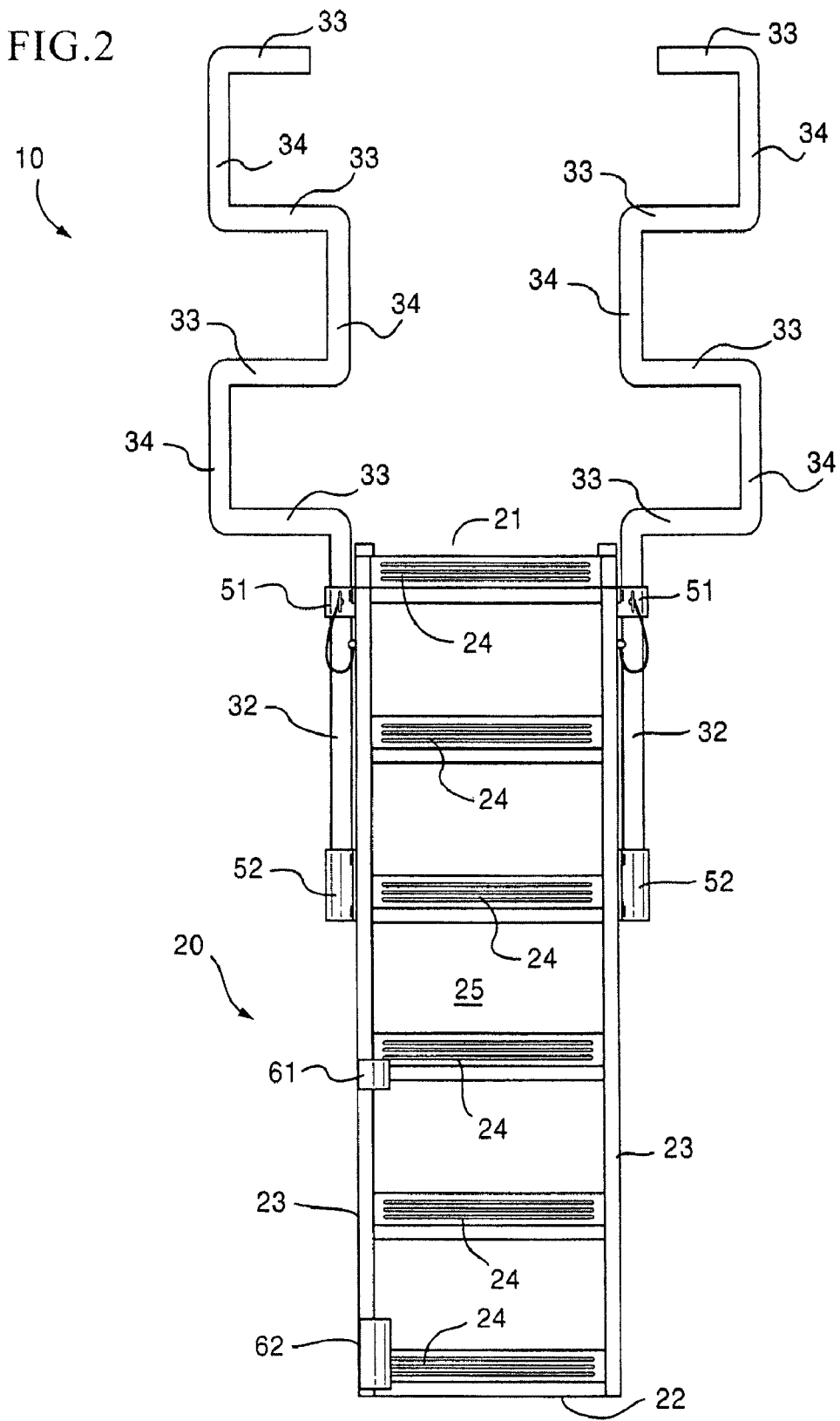
FIG. 2 is a frontal view of a portable safety ladder assembly in an operable or user-ready position.
Figure 3:
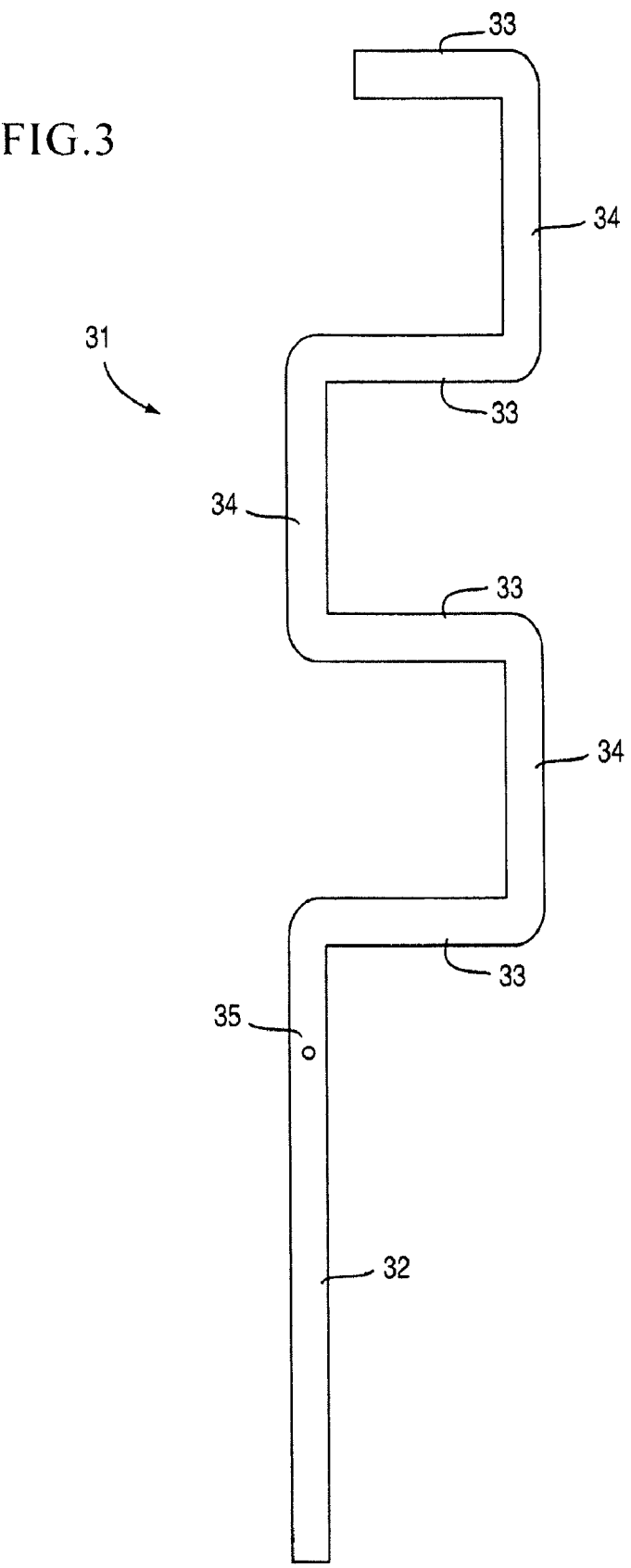
FIG. 3 is a frontal view of a safety extension member.

FIGS. 2 and 3 illustrate a safety extension 30 which includes a pair of safety extension members 31 removeably attached to the ladder 20 by collars 27, 28. Each safety extension member 31 includes a lower section which attaches to the side rails 23 of ladder 20 which permits a user to safely access a working platform. Each safety extension member 31 has a lower section including a support pole or leg 32 and an upper section including a plurality of spaced, parallel horizontal handgrips 33 connected by vertical poles 34 in a unique configurative array permitting the user to maintain a continuum of grips when moving up or down the ladder 20. The space between each handgrip 33 preferably coincides with the spacing between rungs, i.e., about twelve inches. The uppermost handgrip 33 is preferably spaced a distance of about three and one-half feet above the walk-through section 21 to enable the user to stand substantially erect, i.e., not bend over, when either ascending up or descending down the ladder. The spacing of the handgrips is not limited to any particular size, and thus, may vary. Moreover, while a plurality of horizontal handgrips 33 are shown herein, the invention is not limited to a plurality, and thus, may include one or two handgrips, preferably spaced a distance from the walk-through area that permits safe use of the assembly 10 in a similar manner as having a plurality of handgrips.

Figure 4:
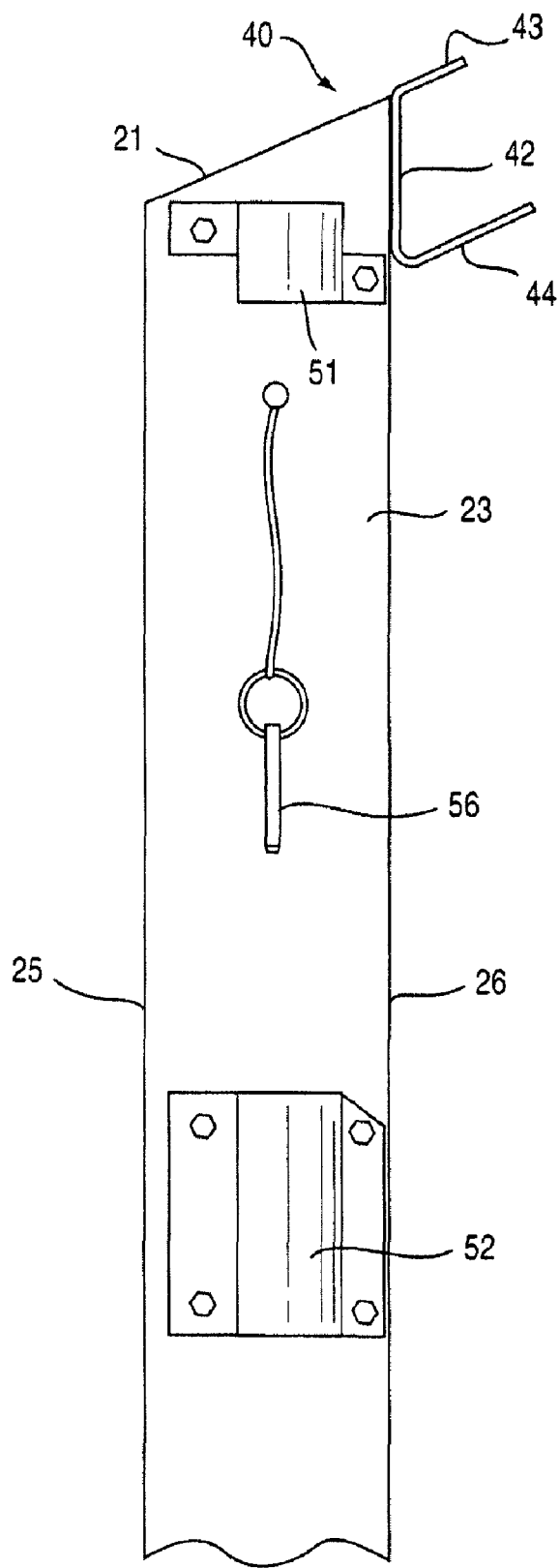
FIG. 4 is a side view of the coupling mechanism and the stabilizing mechanism.

As shown in FIG. 4, a stabilizing mechanism 40 is provided to anchor or otherwise stably secure the ladder 20 to a substantially vertically extending surface of a structure or vehicle at a specific contact or engagement area. In essence, the stabilizing mechanism 40 serves to stabilize the ladder 20 as it leans against a vertically extending surface of an intended structure or vehicle while preventing forward and/or lateral shifting or displacement of the ladder 20 away from a support area on the ground surface, even in hazardous surface conditions such as snow, rain, ice, etc. Such a mechanism includes a C-shaped clamp or bracket 41 attached by bolts or comparable means to the rear section 26 of the ladder 20 for engaging, abutting or otherwise contacting at least the upper surface and outer peripheral contact areas of the frame of the intended structure or vehicle. The bracket 41 includes a base 42 connecting a pair of parallel arms extending from the base 42 in a direction substantially parallel to the ground surface including an upper arm 43 and a lower arm 44 to form a modular unit sized to receive and engage both the front, upper and lower surfaces of the intended contact surface. It should be noted that the size of the brackets 41 is not limited to any particular size, and thus, may vary depending on the application. Moreover, while a single bracket 41 is shown, practice of the invention is not limited to use of a single bracket, and thus, may encompass a stabilizing mechanism 40 having two or a plurality of brackets 41. It should be further noted that the stabilizing mechanism 40 may be retrofitted to existing ladders and/or provided on ladders without safety extensions.

For those applications requiring use of the assembly 10 to access the working platform 110 of the flatbed of a trailer, as illustrated in FIG. 1, the bracket 41 is also adapted to engage, abut or otherwise contact the tie down rail 120 on the frame of the flat bed. An alternative embodiment for flatbed trailer applications is a stabilizing mechanism 40 encompassing a pair of C-shaped clamps or brackets 41a positioned on the outer peripheral edge of the flatbed frame. Each bracket 41a includes a base 42a connecting a pair of parallel arms extending from the base 42a substantially parallel to the ground surface including a left arm 43a and a right arm 44a forming a modular unit sized to receive and engage both the front, inner and outer surface areas of the of a respective side rail 23. The brackets 41a are preferably moveable between a first position within an annular space or compartment within the frame 120 and a second position in which the brackets 41a extend or otherwise protrude from the frame 120 when the assembly 10 is placed in an operable position. The brackets 41a may be retractable or spring-loaded to enable movement from an inoperable, storage position to an operable position. While a stabilizing mechanism 40a having two brackets 41a is illustrated herein, practice of the invention is not limited to any particular number of brackets 41a, and thus, may include a single bracket sized to receive to both front and outermost surface areas of each side rail 23.

Figure 5:
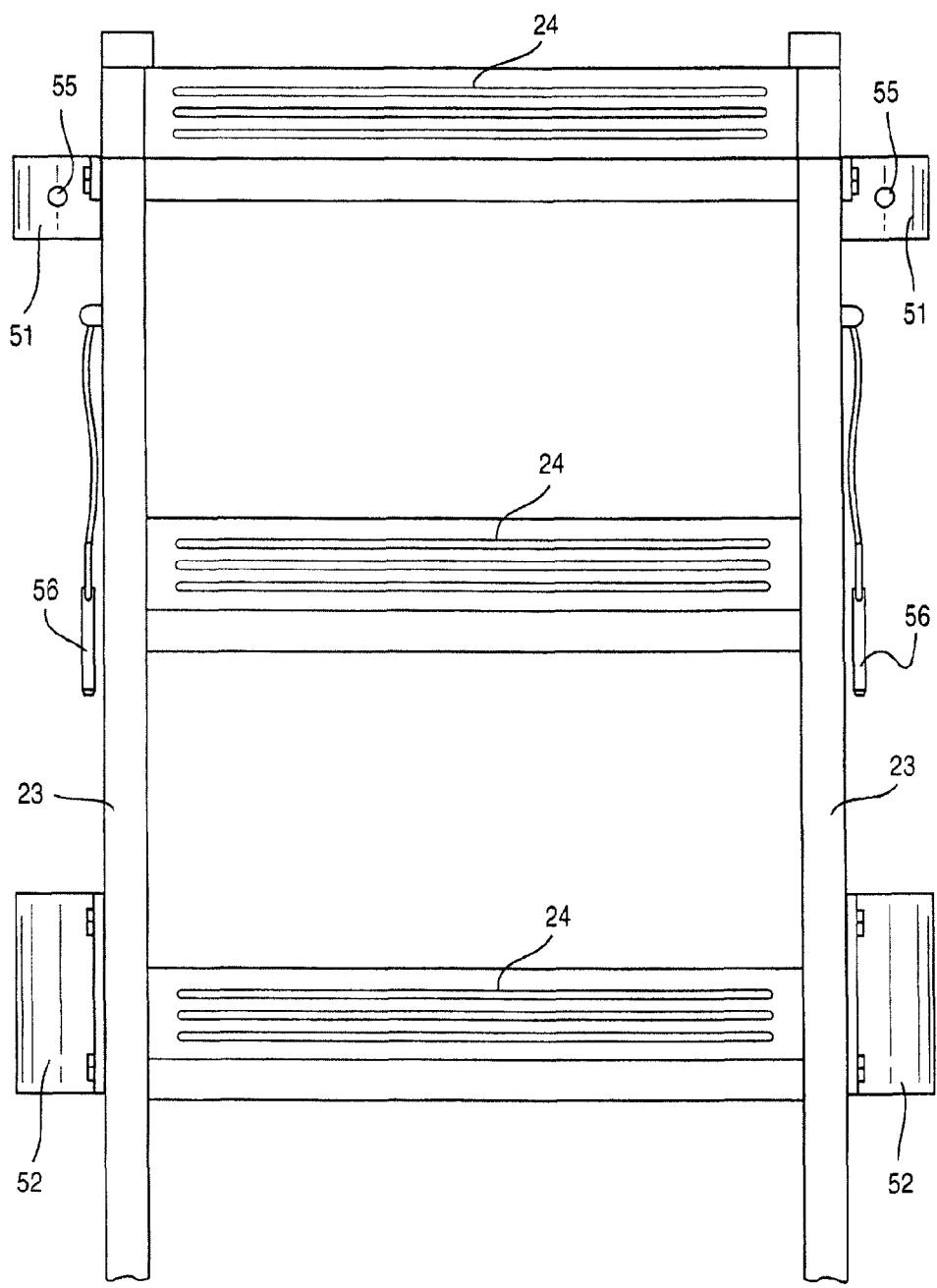
FIG. 5 is a frontal view of a portable safety ladder.

As illustrated in FIG. 5, attached by bolt or comparable means to the outermost peripheral surface of each side rail 23 is a pair of cylindrical-shaped mounting collars 50 including an upper collar 51 and lower collar 52 which permit removable coupling of the safety extension 30 to the ladder 20. The upper collar 51 is located proximate the walk-through area 21 while the lower collar 52 is spaced therebelow towards the base end 22 of the ladder 20. The collars 51, 52 each have an annular channel 53 therein sized to receive the lower support leg 32 of the safety extension members 31 while the lower collar 52 further includes a stop member 54 at a lowermost portion thereof which abuts, contacts or otherwise engages the bottommost portion of the support leg 32 once inserted therein.

As shown in FIG. 2, each support leg 32 is insertable into the collars 51, 52 in such a manner that the safety extension members 31 lie at substantially the same inclined angle as the ladder 20 when the assembly 10 is laid against the intended structure or vehicle, i.e., is placed in the operable position. In essence, both the ladder 20 and the safety extension 30 lie in substantially the same plane when the assembly 10 is placed in the operable position against the intended structure or vehicle.

The support legs 32 may each be provided with one or a plurality of apertures, openings or holes 35 which correspond to a hole 55 in the upper collar 51. These holes 35, 55 are sized to receive one or more locking pins 56 configured to selectively retain or otherwise restrict the support legs 32 within the channel 53. The use of a plurality of holes 35 permits appropriate indexing of the safety extension member 31 to a selected height above the walk-through section 21. The adjustable nature of the safety extension members 31 makes the assembly 10 accommodating to users of varying heights. Each locking pin 56 may be permanently or removeably affixed to each side rail 23 via a chain or comparable means.

Removal of the locking pin 56 from the corresponding holes 35, 55 permits selective rotational and/or longitudinal movement of the safety extension members 31 about a vertical axis at the channel 53. Such movement permits the safety extension members 31 to be moved between operable and inoperable positions and permits selective height adjustments to the safety extension members 31. For example, in the operable position, the safety extension members 31 are flared outwardly relative to the side rails 23, thus making the handgrips 33 accessible for grasping by the user. In the inoperable position, the handgrips 33 are flared inwardly so that a first safety extension member 31 contacts, abuts or otherwise engages the other safety extension member 31. The size of the collars 51, 52 are not limited to any one particular size, and thus, may vary depending on the application.

Figure 6A:
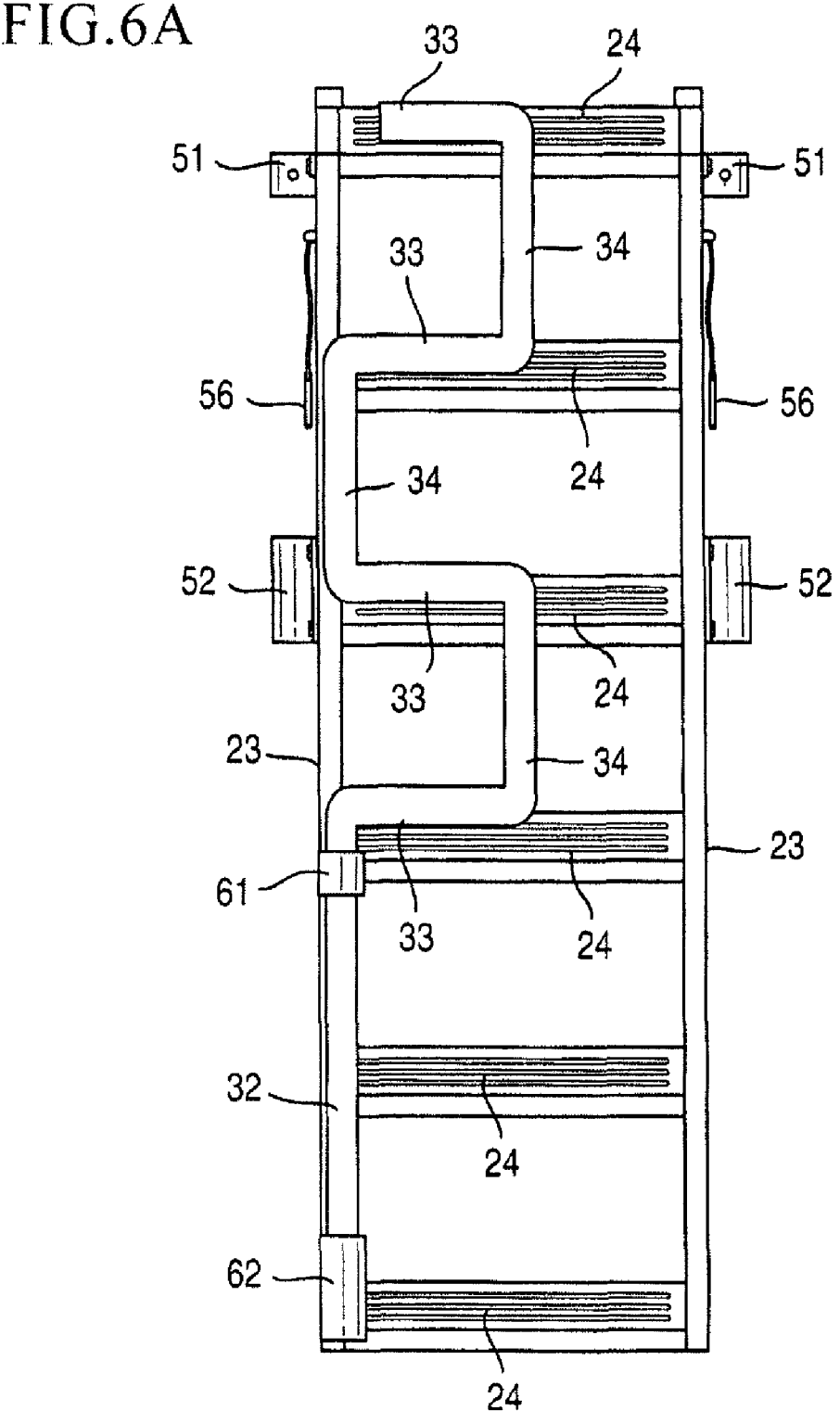
FIG. 6A is a frontal view of a portable safety ladder assembly with a safety extension member in a storage position on the front end of the ladder frame.
Figure 6B:
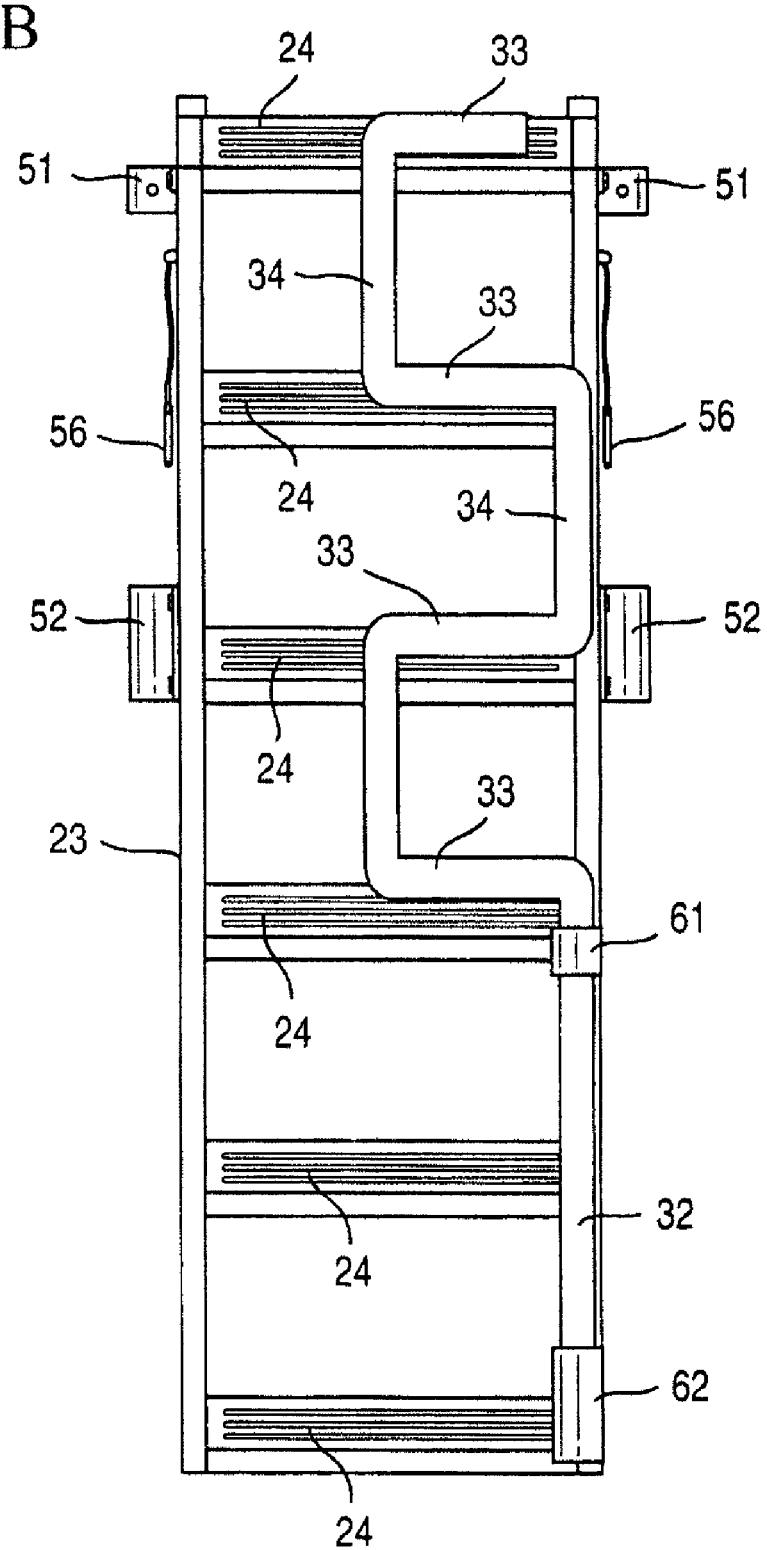
FIG. 6B is a frontal view of a portable safety ladder assembly with a safety extension member in a storage position on the rear end of the ladder frame.

As shown in FIGS. 6A and 6B, a mechanism 60 for stowing away the safety extension members 31 is attached by bolt or comparable means to the front section 25 and rear section 26 of the frame of the ladder 20. A pair of cylindrical-shaped mounting collars including an upper collar 61 and a lower collar 62 which permit removable coupling of the safety extension members 31 to the ladder 20. The upper collar 51 is located proximate the walk-through area 21 while the lower collar 52 is spaced therebelow towards the base end 22 of the ladder 20. The collars 51, 52 have an annular channel 53 therein sized to receive the lower leg portion of each safety extension member 31 while the lower collar 52 further includes a stop member 54 at a lowermost portion thereof which abuts, contacts or otherwise engages the bottommost portion of the safety extension member 31 once received therein. The size of the collars 51, 52 are not limited to any one particular size, and thus, may vary depending on the application.

In order to safely stow the disassembled assembly 10 in a storage area or compartment of a vehicle or structure, a portable rectangular-shaped box, bin or container having an interior spaced sized to receive the assembly 10 may be used. The container may have a hinged or removable opening moveable between an open position allowing the assembly 10 to be fully inserted into the interior space and a closed position sealing the assembly 10 within the space. For those applications requiring use of a transport vehicle such as a truck, trailer and the like, the portable storage container may be fitted and secured underneath the trailer flatbed, permitting easy access thereto when needed.

The components for the ladder 20 and the safety extension 30 are preferably constructed of durable and robust materials such as fiberglass, aluminum, composites, or comparable materials known in the art. While components such as the safety extension 30, stabilizing mechanism(s) 40 and storage assembly 50 are shown herein as a unitary assembly, they are adaptable for retrofitting to existing ladders structures and architectures.

It is apparent that innumerable variations of the preferred embodiments described hereinbefore may be utilized. However, all such variations within the spirit and scope of the invention are deemed to be covered by the following claims.

What is claimed is:

1. A portable safety ladder assembly comprising:
   frame members which extend longitudinally and define a walkthrough area at an upper end thereof when said assembly is in an operable position, said frame members respectively having a base end opposite said upper end which is configured to engage a surface which provides an area of support for said assembly when said assembly is in the operable position;
   a plurality of rungs which extend horizontally between said frame members, with adjacent said horizontal rungs being vertically spaced apart by a first predetermined distance;
   a pair of safety extension members respectively extending upwardly from a frame member of said frame members and spaced apart from each other relative to said frame, each respective safety extension member of said safety extension members having:
      a lower section including a support pole configured for releasable attachment to a respective frame member of said frame members;
      an upper section including first, second, third and fourth handgrips positioned adjacent to said walkthrough area and which extend perpendicularly relative to the support pole, wherein adjacent handgrips are vertically spaced apart by a second predetermined distance;
      a first outer pole which extends perpendicularly relative to the handgrips and above said support pole, said first outer pole configured to directly connect said first and second handgrips;
      a second outer pole which extends perpendicularly relative to the handgrips and above said first outer pole, said second outer pole configured to directly connect said second and third handgrips; and
      a third outer pole which extends perpendicularly relative to the handgrips and above said second outer pole, said third outer pole configured to directly connect said third and fourth handgrips,
   wherein said first, second, and third outer poles on said respective extension member are staggered and distinct poles respectively so that a major length of the first and third outer grips of each respective extension member are collinear with a first axis and the second outer grip of each respective extension member is collinear with a second axis that is parallel and offset from said first axis,
   wherein said fourth handgrip is spatially distanced above said walk-through area by a third predetermined distance to thereby permit a user of said assembly to stand substantially erect at said walkthrough area when said fourth handgrip is engaged by the user.

2. The portable safety ladder assembly of claim 1, wherein:
   the first predetermined distance is the same as the second predetermined distance; and
   the third predetermined distance is greater than the first predetermined distance and the second predetermined distance.

3. The portable safety ladder assembly of claim 1, wherein the first predetermined distance is twelve inches.

4. The portable safety ladder assembly of claim 1, wherein the second predetermined distance is twelve inches.

5. The portable safety ladder assembly of claim 1, wherein the third predetermined distance is about three and one-half feet.

6. The portable safety ladder assembly of claim 1, wherein:
   the first predetermined distance is twelve inches;
   the second predetermined distance is twelve inches; and
   the third predetermined distance is about three and one-half feet.

7. A portable safety ladder assembly comprising:
   frame members which extend longitudinally and define a walkthrough area at an upper end thereof when said assembly is in an operable position;
   a plurality of rungs which extend horizontally provided between said frame members, with adjacent said horizontal rungs being vertically spaced apart by a first predetermined distance;
   safety extension members respectively extending upwardly from a respective frame member of said frame members and spaced apart from each other, each respective safety extension member of said safety extension members having:
      a lower section including a support pole configured for releasable attachment to a respective frame member of said frame members;
      an upper section including first, second, third and fourth handgrips positioned adjacent to said walkthrough area and which extend perpendicularly relative to the support pole, wherein adjacent handgrips are vertically spaced apart by a second predetermined distance;
      a first outer pole which extends perpendicularly relative to the handgrips and above said support pole, said first outer pole configured to directly connect said first and second handgrips;
      a second outer pole which extends perpendicularly relative to the handgrips and above said first outer pole, said second outer pole configured to directly connect said second and third handgrips; and
      a third outer pole which extends perpendicularly relative to the handgrips and above said second outer pole, said third outer pole configured to directly connect said third and fourth handgrips, wherein said fourth horizontal handgrip is spatially distanced above said walk-through area by a third predetermined distance to thereby permit a user of said assembly to stand substantially erect at said walkthrough area when said fourth horizontal handgrip is engaged by the user;
   wherein said first, second, and third outer poles on said respective extension member are staggered and distinct poles respectively so that a major length of the first and third outer grips of each respective extension member are collinear with a first axis and the second outer grip of each respective extension member is collinear with a second axis that is parallel and offset from said first axis,
   stowing devices provided on front and rear walls of a frame member of said frame members and configured to removeably secure and stow said safety extension members on said frame of said frame members when said assembly is in an inoperable position.

8. The portable safety ladder assembly of claim 7, wherein:
the first predetermined distance is the same as the second predetermined distance; and
the third predetermined distance is greater than the first predetermined distance and the second predetermined distance.

9. The portable safety ladder assembly of claim 7, wherein the first predetermined distance is twelve inches.

10. The portable safety ladder assembly of claim 7, wherein the second predetermined distance is twelve inches.

11. The portable safety ladder assembly of claim 7, wherein the third predetermined distance is about three and one-half feet.

12. The portable safety ladder assembly of claim 7, wherein:
the first predetermined distance is twelve inches;
the second predetermined distance is twelve inches; and
the third predetermined distance is about three and one-half feet.

13. The portable safety ladder assembly of claim 7, wherein said stowing device comprises:
a lower stowing collar mounted proximate said base end; and
a upper stowing collar mounted above said second lower stowing collar.

14. A portable safety ladder assembly comprising:
longitudinal frame members each respectively having a front wall, a rear wall and a lateral sidewall,
a walkthrough area provided at an upper end of said frame members;
a plurality of horizontal rungs provided between said frame members, with adjacent said horizontal rungs being vertically spaced apart by a first predetermined distance;
safety extension members respectively extending upwardly at a sidewall of a respective frame member of said frame members, each respective safety extension member of said safety extension members having:
a lower section configured for releasable attachment to a respective frame member of said frame members;
an upper section including first, second, third and fourth handgrips which extend perpendicularly relative to the lower section, with adjacent handgrips being vertically spaced apart by a second predetermined distance;
a first outer pole which extends perpendicularly relative to the handgrips, said first outer pole being configured to directly connect said first and second handgrips;
a second outer pole which extends perpendicularly relative to the handgrips and above said first outer pole, said second outer pole configured to directly connect said second and third handgrips; and
a third outer pole which extends perpendicularly relative to the handgrips and above said second outer pole, said third outer pole configured to directly connect said third and fourth handgrips, wherein said fourth horizontal handgrip is spatially distanced above said walk-through area by a third predetermined distance to thereby permit a user of said assembly to stand substantially erect at said walkthrough area when said fourth horizontal handgrip is engaged by the user when said assembly is in an operable position;
wherein said first, second, and third outer poles on said respective extension member are staggered and distinct poles respectively so that a major length of the first and third outer grips of each respective extension member are collinear with a first axis and the second outer grip of each respective extension member is collinear with a second axis that is parallel and offset from said first axis,
safety extension coupling devices each respectively provided at a sidewall of a frame member of said frame members and configured to removeably couple said safety extension members to said frame member of said members such that said safety extension members lie coplanar with said frame members when said assembly is placed in the operable position; and
stowing devices provided at said front wall and said rear wall of a respective frame member of said frame members and configured to removeably secure and stow said safety extension members on a respective frame member of said frame members when said assembly is in the inoperable position.

15. The portable safety ladder assembly of claim 14, wherein said safety extension coupling comprises:
an upper safety extension coupling collar positioned proximate said walk-through area; and
a lower safety extension coupling collar spaced below said upper safety extension coupling collar towards said base end of said frame.

16. The portable safety ladder assembly of claim 14, wherein:
the first predetermined distance is the same as the second predetermined distance; and
the third predetermined distance is greater than the first predetermined distance and the second predetermined distance.

17. The portable safety ladder assembly of claim 14, wherein the first predetermined distance is twelve inches.

18. The portable safety ladder assembly of claim 14, wherein the second predetermined distance is twelve inches.

19. The portable safety ladder assembly of claim 14, wherein:
the first predetermined distance is twelve inches;
the second predetermined distance is twelve inches; and
the third predetermined distance is about three and one-half feet.

* * * * *